United States Patent [19]
Line

[11] Patent Number: 5,375,952
[45] Date of Patent: Dec. 27, 1994

[54] MILLING AND BORING MACHINE INCORPORATING A GANTRY

[75] Inventor: Henri B. Line, Peymeinade, France

[73] Assignee: Helis S.A., Peymeinade, France

[21] Appl. No.: 126,258

[22] Filed: Sep. 24, 1993

[30] Foreign Application Priority Data

Sep. 29, 1992 [FR] France .................. 92 11609

[51] Int. Cl.$^5$ ............................... B23C 1/06
[52] U.S. Cl. ................... 409/202; 408/234; 409/235
[58] Field of Search ............. 408/234; 409/202, 235

[56] References Cited

U.S. PATENT DOCUMENTS

| | | | |
|---|---|---|---|
| 3,998,127 | 12/1976 | Romeu | 409/235 |
| 4,987,668 | 1/1991 | Roesch | 29/568 |

FOREIGN PATENT DOCUMENTS

| | | | |
|---|---|---|---|
| 3203370 | 5/1983 | Germany. | |
| 975314 | 11/1982 | U.S.S.R. | 408/234 |

*Primary Examiner*—Daniel W. Howell
*Attorney, Agent, or Firm*—Sheridan Ross & McIntosh

[57] ABSTRACT

This invention relates to a vertical milling and boring machine incorporating a gantry, comprising a lower table adapted to support the pieces to be machined, a gantry comprising two uprights disposed on either side of the table and a tie joining the upper ends of said uprights, a crosspiece supported by said gantry and mobile vertically along said uprights, a carriage supported by said crosspiece and mobile horizontally and a tool-holder member mounted to move vertically on said carriage, said table and said gantry being capable of moving with respect to each other, characterized in that the tie presents a flat front face located in the plane of the front faces of the uprights, in that the crosspiece is mobile vertically solely along the front face of said tie, and in that the rear face of the crosspiece is maintained in abutment on the front face of the tie and on the front faces of the uprights, at least during the machining phases, by locking means.

6 Claims, 3 Drawing Sheets

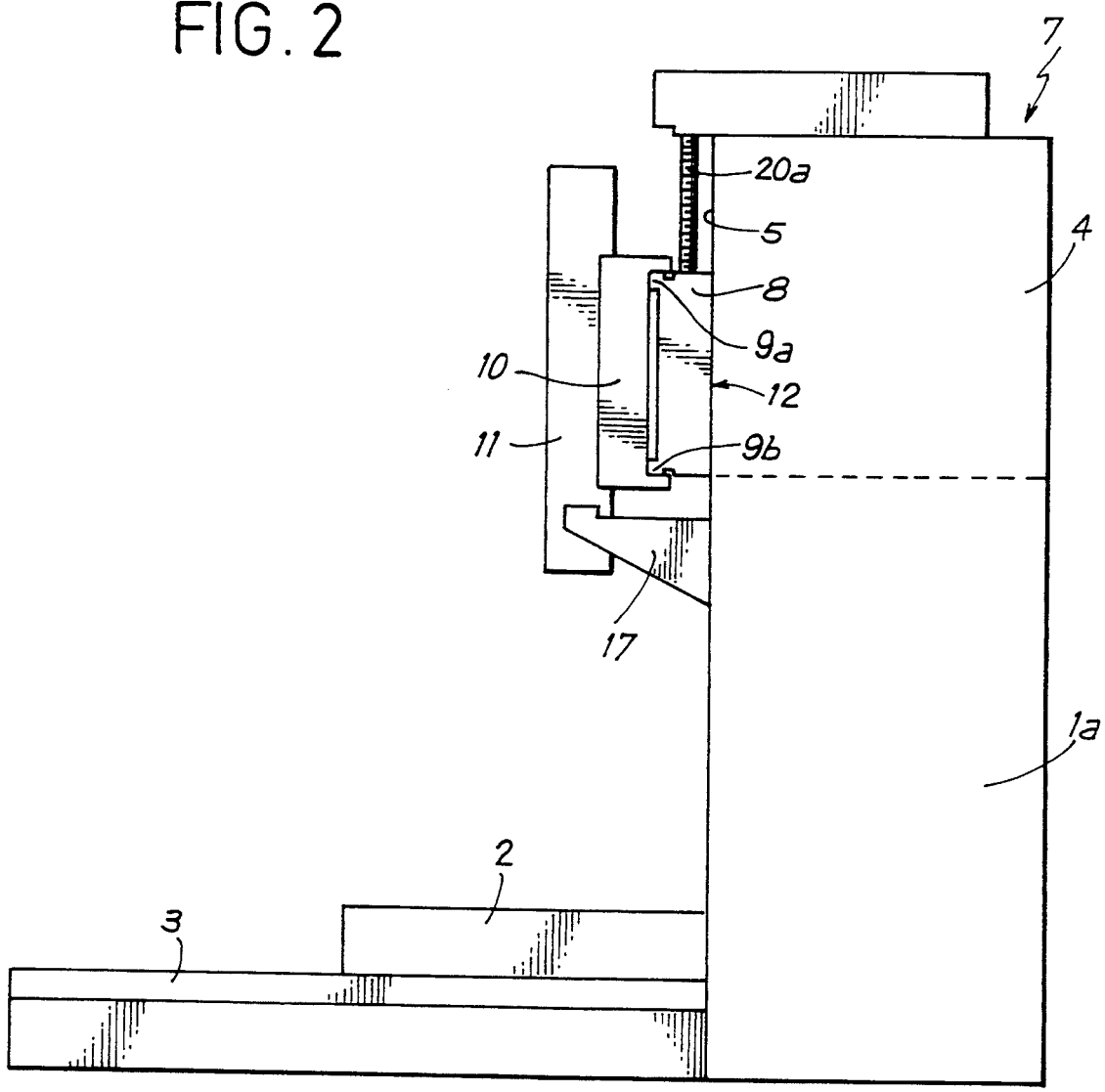

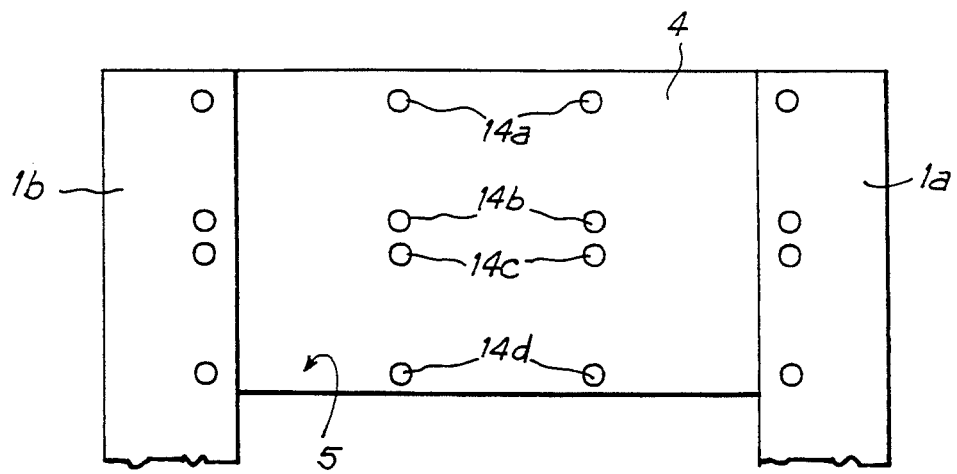
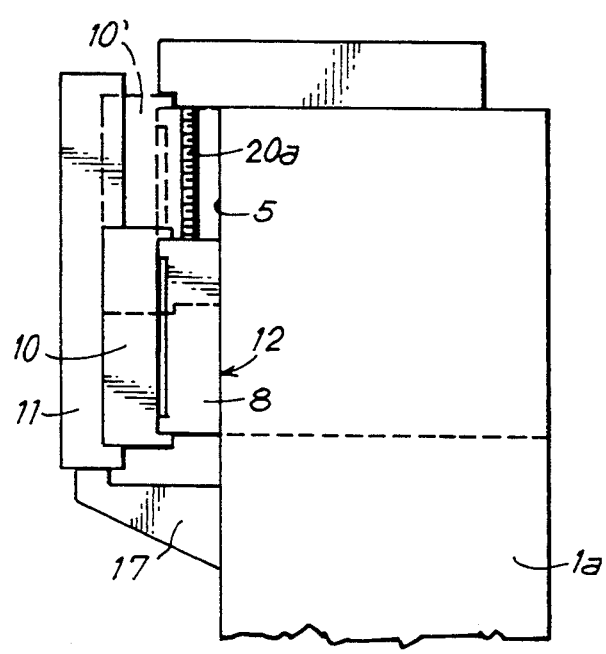
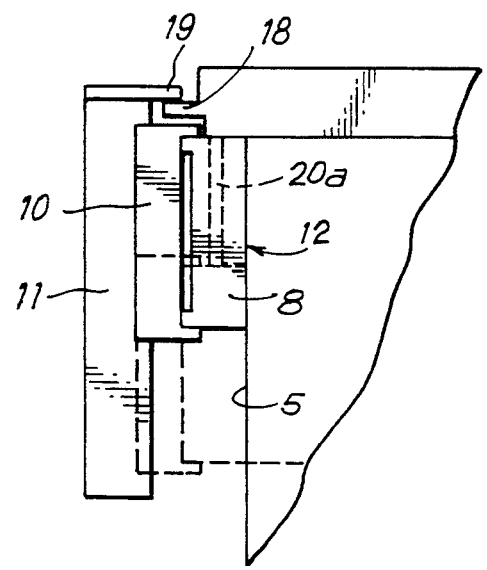

MILLING AND BORING MACHINE INCORPORATING A GANTRY

FIELD OF THE INVENTION

The present invention relates to the domain of machine-tools incorporating a gantry.

It concerns more precisely a vertical milling and boring machine with a gantry, comprising a lower table intended to support the pieces to be machined, a gantry comprising two uprights disposed on either side of the table, and a tie joining the upper ends of said uprights, a crosspiece supported by said gantry and mobile vertically along said uprights, a carriage supported by said crosspiece and mobile horizontally and a tool-holder member mounted to move vertically on said carriage, said table and said gantry being capable of being displaced with respect to each other.

BACKGROUND OF THE INVENTION

Vertical milling and boring machines incorporating a gantry are known, constructed with a fixed crosspiece and a large-stroke machining head. This design is economical but it limits the capacities of use of the machines; for example, it is impossible to use long tools on pieces of great height for lack of clearance stroke under the crosspiece. There is also a reduction in the passage under broach as soon as it is desired to fit a mono- or bi-rotative head whose dimensions in height are of the order of 500 to 700 mm, or a shift of the stroke of use of an adaptable bevel gear.

In order to avoid the limitations of the capacities of the machines with fixed crosspiece, the manufacturers have proposed machines with mobile crosspiece. The crosspiece, which supports and guides the machining head, moves along the two uprights of the gantry: it is guided by precision slideways and generally driven by screw/nut systems. It may be locked in position on the uprights or remain under control during the work, which necessitates very rigid kinematic chains.

This design has at least two major drawbacks.

Firstly, the crosspiece is supported only at the level of the uprights and must therefore be designed with a box of very considerable section so as to limit the deformations associated with the displacement of the machining head, and due to the bending and torsional efforts. With a gantry of given dimensions, the considerable section of the crosspiece brings about a limitation of the section of the tie which joins the two uprights, which weakens the gantry.

In order to avoid this shortcoming, the depth of the uprights must be increased. This results in an increase in weight of the gantry.

Finally, the solutions employed—mobile crosspiece with box, heavier gantry, precision guiding—lead to a considerable increase in the price, of the order of 20 to 30% with respect to the machine-tools with fixed crosspiece.

It is an object of the present invention to propose a vertical milling and boring machine incorporating a gantry, in which the crosspiece may take at least two fixed positions in height so as better to use the removable tools or outfits and not to limit the capacities of use of the machine, this crosspiece being integral with the gantry during the work, in order to ensure rigidity thereof.

SUMMARY OF THE INVENTION

The object is obtained according to the invention in that the tie presents a flat front face located in the plane of the front faces of the uprights, in that the crosspiece is mobile vertically solely along the front face of said tie, and in that the rear face of said crosspiece is maintained in abutment on the front face of the tie and on the front faces of the uprights, at least during the machining phases, by locking means.

Thanks to this structure, the crosspiece is integral with the gantry during the working of the pieces to be machined and the machine-tool then presents the rigidity of a conventional machine with fixed crosspiece without excessive increase in the weight of the gantry. In addition, the possibility of displacing the crosspiece vertically makes it possible to use different types of outfits as a function of the height of the pieces to be machined.

So as to avoid tipping of the tool-holder member, which is very heavy, during displacement of the crosspiece, i.e. during the whole period when it is disconnected from the gantry, the gantry further comprises means for supporting the tool-holder member, intended to support the weight of the tool-holder member during the vertical displacement of said crosspiece.

In addition, this arrangement makes it possible to ease the crosspiece-driving mechanism.

Positive mechanical stops are advantageously provided to delimit the vertical stroke of the crosspiece and to ensure a precise positioning of the crosspiece in its two extreme machining configurations.

The locking means comprise a plurality of lines of jacks distributed along the crosspiece, said jacks actuating work heads capable of sliding in vertical grooves during the vertical displacement of the crosspiece.

BRIEF DESCRIPTION OF THE DRAWINGS

The invention will be more readily understood on reading the following description with reference to the accompanying drawings, in which:

FIG. 2 is a side view of the milling and boring machine of FIG. 1.

FIG. 3 is a front view of the gantry alone.

FIG. 4 shows the means for supporting the tool-holder member in a first embodiment, the crosspiece being shown in solid lines in lower position and in broken lines in upper position.

FIG. 5 shows the means for supporting the tool-holder member in a second embodiment, the crosspiece being shown in solid lines in upper position and in broken lines in lower position.

DETAILED DESCRIPTION OF THE DRAWINGS

Figure 1:
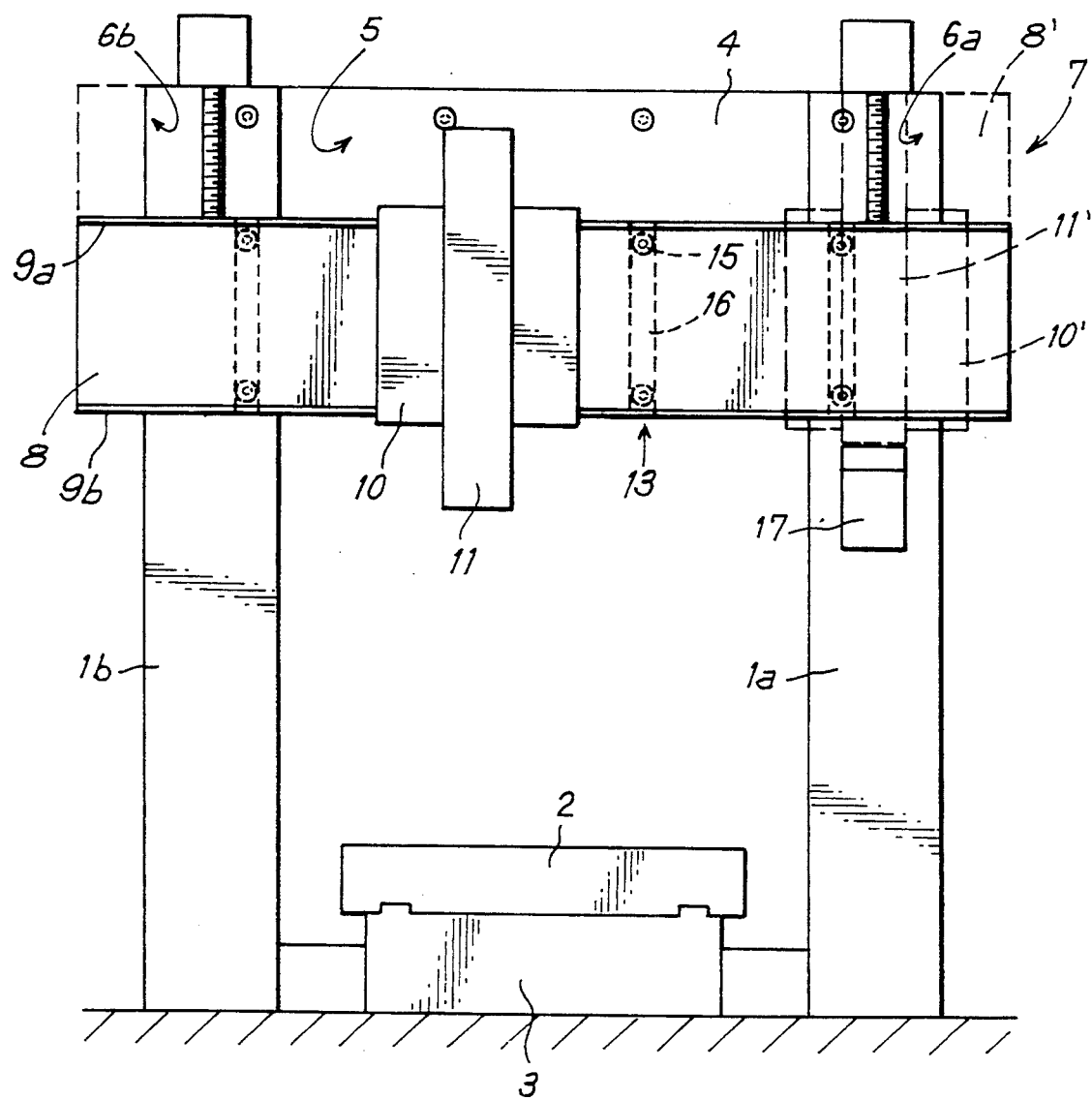
FIG. 1 is a view in elevation of the vertical milling and boring machine incorporating a gantry, according to the invention.

Referring now to the drawings, the vertical milling and boring machine with gantry shown therein, comprises two vertical uprights 1a, 1b, disposed on either side of a table 2 mounted to slide on a frame 3 and adapted to support a piece to be machined (not shown in the drawings).

The upper ends of the uprights 1a, 1b are joined together by a rigid tie 4, of large section, which presents a flat front face 5 located in the plane of the front faces 6a, 6b of uprights 1a, 1b.

The gantry 7 constituted by the uprights 1a, 1b and the tie 4 supports a crosspiece 8 disposed on the front of the gantry 7 and which can be vertically displaced along the front face 5 of the tie 4. This crosspiece 8 is provided on its front face with horizontal slideways 9a, 9b for supporting and guiding a carriage 10 on which is mounted a vertically mobile tool-holder member 11.

Crosspiece 8 presents a constant section over the whole of its length and its flat rear face 12 is in abutment on the front faces 5 of the tie 4, at least during the working of the piece to be machined, thanks to locking means 13.

These locking means 13 comprise locking jacks disposed in vertical lines on the front face of the gantry 7 and which actuate locking heads 15 allowing, via vertical grooves 16 made in the crosspiece 8, an extremely powerful locking of the crosspiece 8 on the gantry 7. The front face of the jacks comprises an easily dismountable washer which, after measuring the defects and correction, makes it possible rapidly to make the precisions of the front face of the crosspiece 8, and therefore of the displacement of the tool-holder member 11.

The number of lines of jacks is a function of the length of the crosspiece. Each line of jacks comprises for example four jacks 14a, 14b, 14c, 14d. Jacks 14a and 14c lock crosspiece 8 in upper position. Jacks 14b and 14d lock crosspiece 8 in lower position. The maximum stroke of crosspiece 8 is defined by means of upper and lower positive stops (not shown in the drawings).

In order to avoid tipping of the tool-holder member 11 during vertical displacement of the crosspiece 8, it is provided to have this tool-holder member 11 supported by the gantry 7 with the aid of supporting means.

According to a first embodiment shown in FIG. 4, these supporting means comprise a rest 17 fixed on the upright 1a and on which the tool-holder member 11 can rest.

According to a second embodiment shown in FIG. 5, the supporting means comprise a bracket 18 fixed on the upper face of the gantry 7 which is capable of cooperating with a fastening tab 19 provided in the upper part of the tool-holder member 11. The vertical displacement of the crosspiece 8 is obtained by means of two screws or jacks 20a and 20b driven in synchronization and disposed in the central vertical plane of the crosspiece 8.

FIGS. 1 and 2 show the crosspiece 8 in its lower working position, crosspiece 8 being positively in abutment on the lower stops and jacks 14b and 14d being tightened. In this position, crosspiece 8 is integral with the gantry 7, its rear face 12 being in abutment on the front faces 6a and 6b of the uprights 1a and 1b, and on the front face 5 of the crosspiece 4. To displace the crosspiece 8 upwardly, one proceeds in the manner described hereinafter.

The tool-holder member 11 is raised. The carriage is displaced towards upright 1a until the tool-holder member 11 lies above the rest 17. The tool-holder member 11 is lowered so that it rests on rest 17. Jacks 14b, 14d are loosened. Screws 20a and 20b are actuated in synchronism, which has for its effect to raise the crosspiece 8 and carriage 10, the tool-holder member 11 remaining fixed on rest 17 and sliding in the vertical slideways of the carriage 10. When the crosspiece 8 is positively in abutment on the upper stops, jacks 14a and 14c are actuated in order to lock the crosspiece 8 in the upper working position. The tool-holder member 11 is raised slightly so that it no longer rests on rest 17, then the carriage 10 is displaced towards a working position located above the table 2.

In the drawings, reference 10' represents the carriage in position above the rest 17. Reference 11' represents the tool-holder member when it rests on rest 17 and reference 8' represents the crosspiece in upper position.

When rest 17 is replaced by bracket 18 and fastening tab 19, the process for displacing the crosspiece 8 is identical to the process described hereinbefore except that the tool-holder member 11 is suspended from the bracket 18 instead of it resting on rest 17. Naturally, the crosspiece 8 must have a stroke less than the stroke of the tool-holder member, which is usually the case.

The means for supporting the tool-holder member 11 make it possible to relieve the crosspiece 8 of the weight of this member during its vertical displacement. This arrangement makes it possible to eliminate the slideways usually used for supporting and guiding the crosspiece 8.

When it is desired to displace the crosspiece downwardly, one proceeds likewise in the manner described hereinabove. The tool-holder member 11 is supported by the rest 17 or the bracket 18 before loosening the jacks 14a and 14c.

During the vertical displacement of the crosspiece 8, the locking heads 15 slide freely in the grooves 16 of the crosspiece 8.

In the mode of operation described hereinabove, two work positions are provided: an upper position in which the crosspiece 8 is in abutment on the upper stops and a lower position in which the crosspiece 8 is in abutment on the lower stops. The stops make it possible positively to ensure a precise positioning before locking. It goes without saying that the invention also concerns a milling and boring machine such as the one described hereinabove, in which the crosspiece 8 may be fixed on the gantry 7 in any intermediate position between the upper position and the lower position.

The foregoing description concerns a vertical milling and boring machine comprising a fixed gantry and a mobile table. The invention also covers a milling and boring machine with mobile gantry and fixed table.

What is claimed is:

1. A vertical milling and boring machine incorporating a gantry, comprising a lower table adapted to support the pieces to be machined, a gantry comprising two uprights disposed on either side of the table and a tie joining the upper ends of said uprights, a crosspiece supported by said gantry and mobile vertically along said uprights, a carriage supported by said crosspiece and mobile horizontally and a tool-holder member mounted to move vertically on said carriage, said table and said gantry being capable of moving with respect to each other, wherein the tie presents a flat front face located in the plane of the front faces of the uprights, the crosspiece is mobile vertically solely along the front face of said tie, and the rear face of the crosspiece is maintained in abutment on the front face of the tie and on the front faces of the uprights, at least during the machining phases, by locking means.

2. The milling and boring machine of claim 1, wherein the gantry further comprises means for supporting the tool-holder member, said means being adapted to support the weight of said tool-holder member during the vertical displacement of said crosspiece.

3. The milling and boring machine of claim 2, wherein the means for supporting the tool-holder member comprise a fixed bracket mounted on the upper face of the gantry and a fastening tab provided in the upper part of the tool-holder member, said tab being capable of resting on said bracket.

4. The milling and boring machine of claim 2, wherein the means for supporting the tool-holder member comprise a rest fixed to one of the uprights and on which the tool-holder member is capable of resting.

5. The milling and boring machine of claim 1, wherein the locking means comprise a plurality of lines of jacks distributed along the crosspiece, said jacks actuating working heads capable of sliding in vertical grooves during the vertical displacement of the crosspiece.

6. The milling and boring machine of claim 5, wherein the jacks are mounted on the gantry.

* * * * *